United States Patent [19]
Bittner

[11] Patent Number: 5,568,044
[45] Date of Patent: Oct. 22, 1996

[54] VOLTAGE REGULATOR THAT OPERATES IN EITHER PWM OR PFM MODE

[75] Inventor: Harry J. Bittner, Santa Clara, Calif.

[73] Assignee: Micrel, Inc., San Jose, Calif.

[21] Appl. No.: 313,489

[22] Filed: Sep. 27, 1994

[51] Int. Cl.⁶ ........................................................ G05F 1/40
[52] U.S. Cl. ............................ 323/272; 323/287; 323/224
[58] Field of Search ............................... 363/21, 41, 23; 323/268, 284, 272, 271, 224, 285, 286, 287

[56] References Cited

U.S. PATENT DOCUMENTS

| | | | |
|---|---|---|---|
| 4,047,083 | 9/1977 | Plunkett | 363/41 |
| 4,400,767 | 8/1983 | Fenter | 363/21 |
| 4,456,872 | 6/1984 | Froeschle | 323/286 |
| 4,626,763 | 12/1986 | Edwards | 363/41 |
| 5,481,178 | 1/1996 | Wilcox et al. | 323/287 |

*Primary Examiner*—Peter S. Wong
*Assistant Examiner*—Shawn Riley
*Attorney, Agent, or Firm*—Skjerven, Morrill, MacPherson, Franklin & Friel; William L. Paradice, III

[57] ABSTRACT

A switching voltage regulator achieves high efficiency by automatically switching between a pulse frequency modulation (PFM) mode and a pulse-width modulation (PWM) mode. Switching between the modes of voltage regulation is accomplished by monitoring the output voltage and the output current, wherein the regulator operates in PFM mode at small output currents and in PWM mode at moderate to large output currents. PFM mode maintains a constant output voltage by forcing the switching device to skip cycles when the output voltage exceeds its nominal value. In PWM mode, a PWM signal having a variable duty cycle controls the switching device. A constant output voltage is maintained by feedback circuitry which alters the duty cycle of the PWM signal according to fluctuations in the output voltage.

6 Claims, 9 Drawing Sheets

VOLTAGE REGULATOR THAT OPERATES IN EITHER PWM OR PFM MODE

FIELD OF THE INVENTION

The present invention relates to a voltage regulator. More specifically, the present invention relates to a high efficiency switching voltage regulator capable of operating in either one of two modes.

BACKGROUND OF THE INVENTION

Typically, voltage regulator circuits provide a constant output voltage of a predetermined value by monitoring the output and using feedback to keep the output constant. In a typical pulse width modulation (PWM) regulator circuit, a square wave is provided to the control terminal of the switching device to control its on and off states. Since increasing the on time of the switching device increases the output voltage, and vice versa, the output voltage may be controlled by manipulating the duty cycle of the square wave. This manipulation is accomplished by a control circuit which continually compares the output voltage to a reference voltage and adjusts the duty cycle of the square wave to maintain a constant output voltage.

When the switching device is an MOS transistor, a significant amount of power is used to periodically charge the gates of the switching transistors. As the switching frequency increases, more power is lost. If the switching frequency is too low and the output current of the regulator is high, the output voltage of the regulator will be difficult to filter and convert to a DC voltage. Hence, the switching frequency must be kept relatively high. When the output current is low, the relatively high power loss due to controlling the switching transistors results in a low efficiency (output power/total power consumed) regulator.

A continuing challenge in the design of voltage regulators is to reduce the power loss in the regulator circuit and thereby increase its efficiency. As such, the power dissipate in the control circuitry and switching circuitry of the PWM regulator is of great concern.

SUMMARY OF THE INVENTION

A switching voltage regulator is disclosed which is capable of operating in either a pulse frequency modulation (PFM) or pulse-width modulation (PWM) mode. The voltage regulator achieves high efficiency by automatically choosing the more efficient mode of regulation based on a continuous monitoring of the output current and the output voltage. The regulator operates in PFM mode when the regulator generates a small output current and switches to PWM operation when the regulator generates a moderate to large output current.

A PFM mode of voltage regulation provides better efficiency at small output current levels than does a PWM mode. First, a PFM mode requires a fewer turn-on transitions to maintain a constant output voltage than does a PWM mode of voltage regulation, thus resulting in a lower gate-drive power dissipation for PFM mode. Second, since a PFM mode can be achieved with a much simpler control circuit having fewer components, the power dissipation in the control loop of a PFM mode is less than that of the control loop of a PWM mode.

However, when the output current reaches a moderate level, a PFM mode of voltage regulation becomes impractical, since the maximum output current available from a PFM mode is generally much less than that available from a PWM mode. Thus, the present invention switches from a PFM mode of operation to a PWM mode of operation when the output current exceeds a predetermined level.

A novel technique to determine when to operate in PWM or PFM mode is also described along with a novel PFM type voltage regulator.

DETAILED DESCRIPTION OF PREFERRED EMBODIMENT

Figure 1:
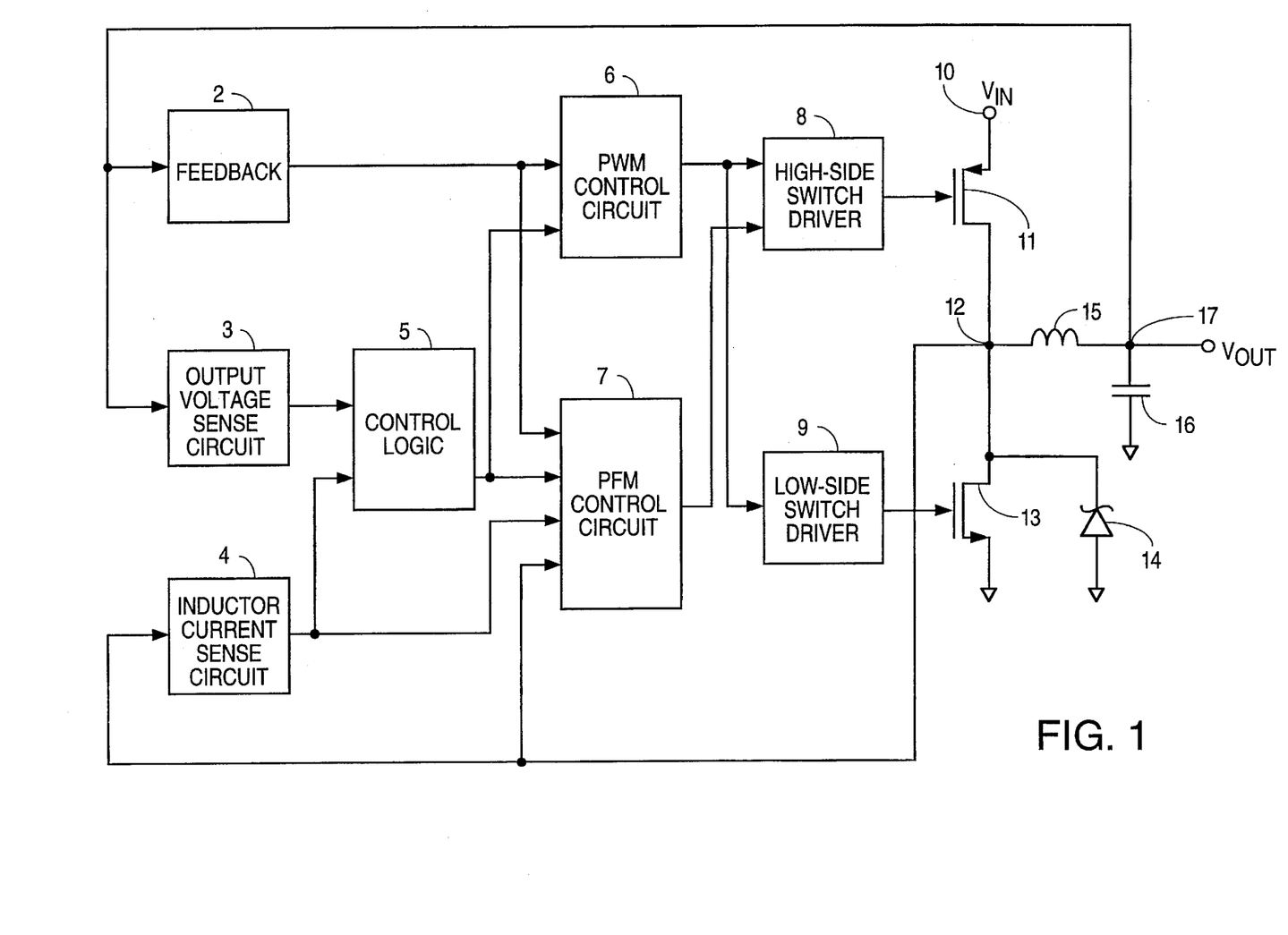
FIG. 1 is a simplified block diagram of one embodiment of the present invention.

FIG. 1 is a simplified block diagram of an embodiment of the present invention. The voltage regulator of FIG. 1 includes a feedback circuit 2, output voltage sensing circuit 3, inductor current sensing circuit 4, control logic circuit 5, PWM control circuit 6, PFM control circuit 7, high-side switch driver 8, low-side switch driver 9, input terminal 10, high-side switch 11, switching node 12, low-side switch 13, schottky diode 14, inductor 15, capacitor 16, and output terminal 17.

High-side switch 11 is preferably a P-channel MOSFET that has a first terminal connected to input terminal 10 and a second terminal connected to a terminal (switching node 12) of inductor 15. The other terminal of inductor 15 is connected to output terminal 17.

PWM control circuit 6, which includes a PWM signal generator, has an output terminal connected to a first input terminal of the high-side switch driver 8. The output terminal of PWM control circuit 6 is also connected to the low-side switch driver 9. The output terminal of high-side switch driver 8 is connected to the control terminal of high-side switch 11 for supplying a voltage to turn switch 11 on and off. Similarly, the output terminal of low-side switch driver 9 is connected to the control terminal of low-side switch 13, which is preferably an N-channel MOSFET, for supplying a voltage to turn switch 13 on and off. A schottky diode 14 is placed in parallel with low side switch 13 for shunting current to ground when current discharging from inductor 15 forces switching node 12 below approximately −0.4 volts.

Feedback circuit 2 is coupled between output terminal 17 and a first input terminal of PWM control circuit 6 for providing a feedback signal to PWM control circuit 6. This feedback signal is also provided to a first input terminal of PFM control circuit 7. PFM control circuit 7 has a second input terminal connected to switching node 12 for sensing the voltage $V_{sw}$ at switching node 12 and has an output terminal connected to a second input terminal of high-side switch driver 8 for controlling the on and off states of switch 11.

Output voltage sensing circuit 3 has an input terminal connected to output terminal 17 and an output terminal connected to a first input terminal of control logic circuit 5.

Inductor current sensing circuit 4 has an input terminal connected to switching node 12 and an output terminal connected to a second input terminal of control logic circuit 5 and to a third input terminal of PFM control circuit 7. An output terminal of control logic circuit 5 is connected to a second input terminal of PWM control circuit 6 and to a fourth input terminal of PFM control circuit 7. Control logic circuit 5 enables/disables PWM control circuit 6 and PFM control circuit 7, thus determining in which mode the regulator will operate.

Capacitor 16 is coupled between output terminal 17 and ground and acts to smooth the voltage at output terminal 17.

The operation of the regulator is as follows. When an input voltage $V_{in}$ to be regulated is supplied to the regulator circuit via input terminal 10, the voltage at output terminal 17, $V_{out}$, is initially below its nominal value, $V_{out,nom}$. Output voltage sensing circuit 3 detects the low value of $V_{out}$ and sends a logic low signal to control logic circuit 5, which in turn enables PWM control circuit 6 and disables PFM control circuit 7. This state is denoted as PWM mode.

Once in PWM mode, PWM control circuit 6 generates and transmits a fixed frequency square wave to the first inputs of high-side switch driver 8 and low-side switch driver 9 which, as mentioned previously, control the on and off states of switches 11 and 13. A high PWM signal turns high-side switch 11 on and turns low-side switch 13 off. Conversely, a low PWM signal turns high-side switch 11 off and turns low-side switch 13 on. Operating switches 11 and 13 in a push-pull fashion allows inductor 15 to store current from input terminal 10 when switch 11 is on and discharge current to output terminal 17 when switch 11 turns off.

Figure 2A:
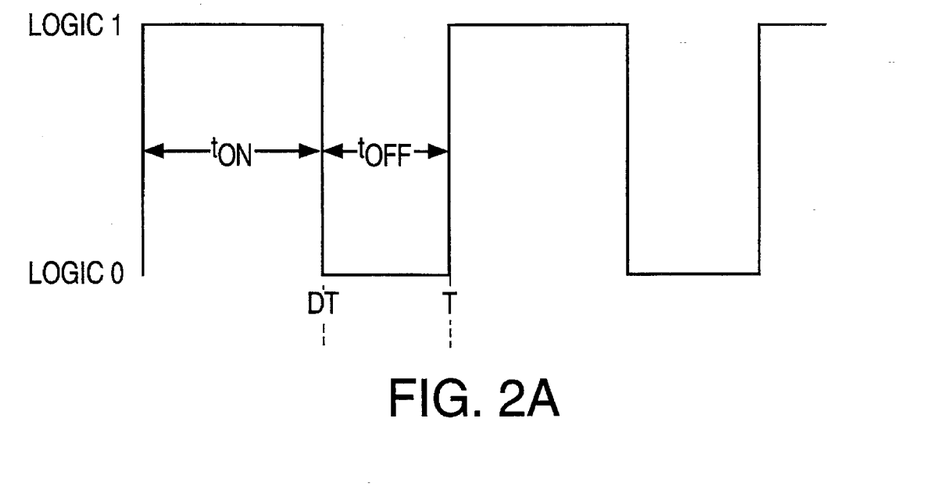
FIG. 2A is a pictorial representation of the PWM control signal.

FIG. 2A illustrates a PWM square wave signal having a period of T. This PWM signal has an on-time (representing a logic high) from t=0 to t=DT and an off-time (representing a logic low) from t=DT to t=T, where the duty cycle of the signal is defined as the ratio of on-time to period T.

A feedback voltage $V_{fb}$ corresponding to $V_{out}$ is coupled to PWM control circuit 6 via feedback circuit 2. PWM control circuit 6 compares $V_{fb}$ to a reference voltage $V_{ref}$ and adjusts the duty cycle of the PWM square wave signal such that $V_{fb}$ is equal to $V_{ref}$.

PWM control circuit 6 continues to control switches 11 and 13 until the peak current flowing through inductor 15, denoted as $I_{ind,pk}$, drops below a predetermined level, $I_{pk,min}$. When $I_{ind,pk}$ drops below $I_{pk,min}$, inductor sensing circuit 4 sends a first enabling signal to control logic circuit 5. If output voltage sensing circuit 3 detects that $V_{out}$ has not dropped below the regulated output voltage value, output voltage sensing circuit 3 sends a second enabling signal to control circuit 5, which then simultaneously disables PWM control circuit 6 and enables PFM control circuit 7. When PWM control circuit 6 is disabled, low-side switch 13 is turned off and will remain off until PWM control circuit 6 is re-enabled. This state is known as PFM mode.

Figure 2B:
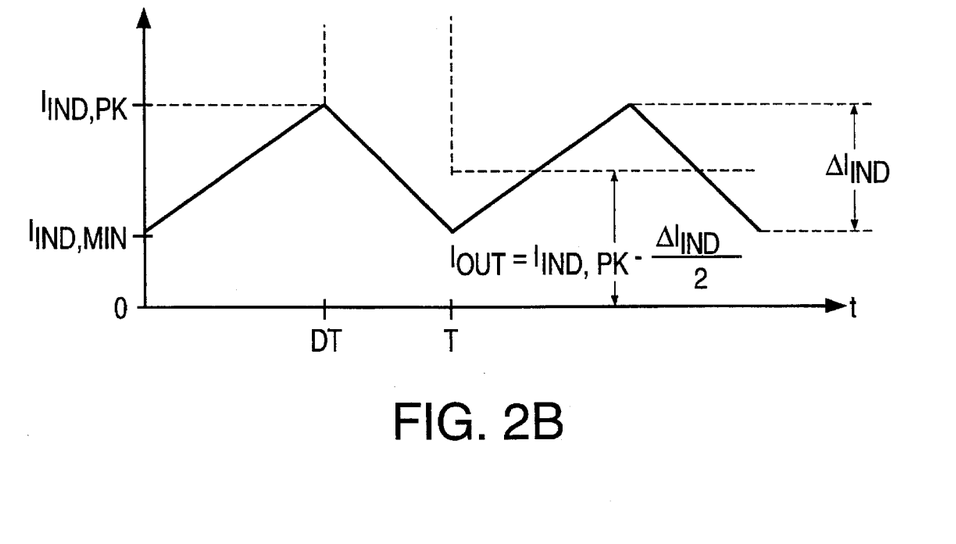
FIG. 2B is a pictorial representation of the inductor current during PWM mode of voltage regulation.

FIG. 2B illustrates the inductor current during PWM mode. The relationship between $I_{pk,min}$ and $I_{out,min}$ is set by the following equation:

$$I_{out,min} = I_{pk,min} - \Delta I_{ind}/2 \tag{1}$$

It can be seen from the above equation that detecting $I_{pk,min}$ accurately corresponds to detecting a constant value of $I_{out,min}$ as long as the change in $\Delta I_{ind}$ remains small relative to $I_{pk,min}$. If $\Delta I_{ind}$ changes substantially compared to $I_{pk,min}$, then $I_{pk,min}$ must change in equal proportion to changes in $\Delta I_{ind}$ in order for $I_{out,min}$ to remain constant.

Referring back to FIG. 1, when the regulator circuit begins operating in PFM mode, PFM control circuit 7 sends an activation signal to high-side switch driver 8, thus turning on switch 11. As mentioned earlier, switch 13 remains in an off state during PFM mode. Switch 11 will remain on until the inductor current $I_{ind}$ charges to an upper limit, $I_{Lim,PFM}$. When inductor current sensing circuit 4 detects that this limit has been reached, inductor current sensing circuit 4 sends a de-activation signal to high-side switch driver 8, thereby turning switch 11 off. The inductor current $I_{ind}$ then discharges through schottky diode 14, causing the voltage at switching node 12, $V_{sw}$, to swing from approximately $V_{in}$ to −0.4V. When $I_{ind}$ reaches a zero level, $V_{sw}$ changes abruptly from −0.4V to $V_{out}$. PFM control circuit 7 detects this abrupt increase in $V_{sw}$ and turns on switch 11. Thus, when operating in PFM mode, the regulator circuit monitors the inductor current and the voltage at switching node 12 to determine when to turn on and off high-side switch 11. This PFM mode of voltage regulation is advantageous over others since an internal oscillator is not required.

PFM control circuit 7 regulates $V_{out}$ by controlling the on and off states of switch 11 and by preventing switch 11 from turning on when $V_{out}$ exceeds its predetermined nominal value, $V_{out,nom}$, as follows. PFM control circuit 7 includes a comparator which compares feedback signal $V_{fb}$, which is proportional to $V_{out}$, to reference voltage $V_{ref}$. $V_{ref}$ has an upper value $V_{ref,H}$ and a lower value $V_{ref,L}$. If $V_{fb}$ is less than $V_{ref,H}$ PFM control circuit 7 will turn on switch 11 as described in the previous paragraph. If, however, $V_{fb}$ exceeds $V_{ref,H}$ (corresponding to $V_{out}$ exceeding $V_{out,nom}$), $V_{ref}$ will fall to $V_{ref,L}$, causing PFM control circuit 7 to turn switch 11 off. $V_{fb}$ must then fall below $V_{ref,L}$ before PFM control circuit 7 again turns on switch 11. This method of regulating the $V_{out}$ by preventing switch 11 from turning on when $V_{out}$ exceeds its nominal value $V_{out,nom}$ is commonly referred to as "skipping cycles". The PFM characteristic of the reference voltage $V_{ref}$ prevents the regulator from sporadically skipping cycles.

Figure 3A:
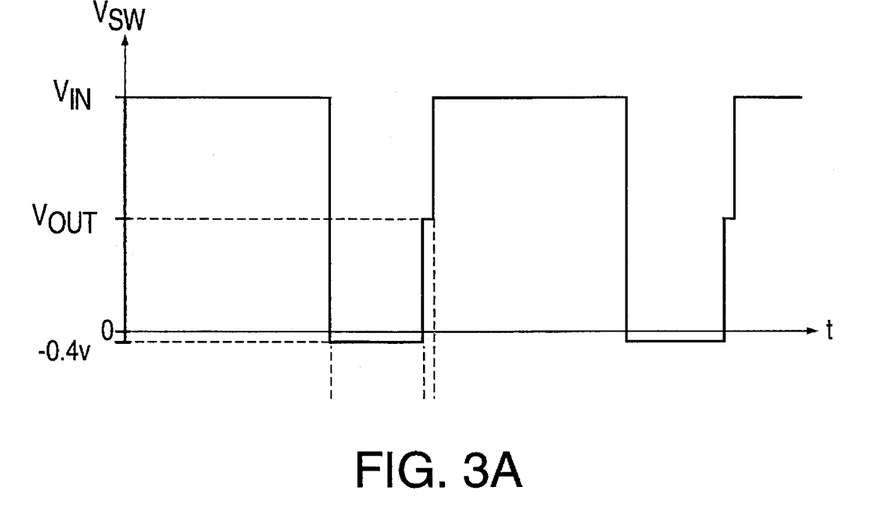
FIGS. 3A and 3B are pictorial representations of the output switch voltage and the inductor current during PFM mode of voltage regulation, respectively.
Figure 3B:
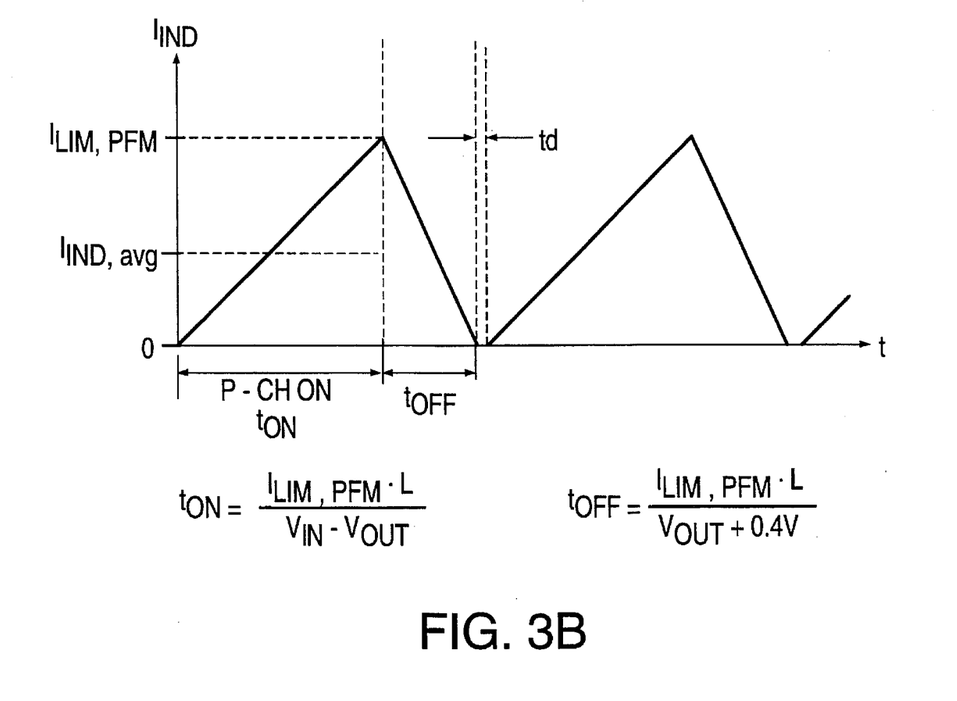

FIGS. 3A and 3B illustrate the waveforms of the voltage at switching node 12, $V_{sw}$, and the inductor 15 current, $I_{ind}$, where $t_{on}$ is the on time of switch 11, $t_{off}$ is the off time of switch 11, $I_{ind,avg}$ is the time average value of $I_{ind}$, and td=the delay time between $I_{ind}$ discharging to zero and high-side switch 11 turning on. The above parameters are defined by the following equations:

$$I_{ind,avg} = \frac{I_{Lim,PFM}(t_{on} + t_{off})}{2(t_{on} + t_{off} + td)} = \frac{I_{Lim,PFM}}{2} \tag{Eq. 2}$$

$$t_{on} = \frac{I_{Lim,PFM} \cdot L}{V_i - V_{out}} \tag{Eq. 3}$$

$$t_{off} = \frac{I_{Lim,PFM} \cdot L}{V_{out} + 0.4V} + td \tag{Eq. 4}$$

It can be seen from FIG. 3B that the average value of the inductor current waveform $I_{ind,avg}$ is a function of only $I_{Lim,PFM}$, assuming that td is relatively small compared to the switching period. The values of $t_{on}$ and $t_{off}$ will vary as function of $V_{in}$, $V_{out}$, and the inductance L of inductor 15.

When the regulator is supplying maximum current to output terminal 17 in PFM mode, switch 11 turns on at every switching cycle. Therefore, the maximum output current the regulator can supply when operating in PFM mode, $I_{ind,avg}$, will always be equal to $I_{Lim,PFM}/2$ irrespective of the values of $V_{in}$, $V_{out}$, and L. This circuit is thus advantageous over previous methods of PFM mode regulation whose maximum output currents are dependent upon input voltage, output voltage, and inductance values.

The regulator circuit monitors $V_{out}$ to determine when to switch from PFM mode to PWM mode as follows. When the output current exceeds the maximum current the regulator is able to supply in PFM mode, i.e., when $I_{out}$ exceeds $I_{Lim,PFM}/2$, $V_{out}$ falls below $V_{out,nom}$. Output voltage sensing circuit 3 detects this change in $V_{out}$ and sends a logic low signal to control logic circuit 5. In response to this low signal, control logic circuit 5 sends a disable signal to PFM control circuit 7 and an enable signal to PWM control circuit 6, thus switching the circuit from PFM mode to PWM mode.

In order to make a clean transition between PFM and PWM modes of operation, the following conditions must be met: (1) the output sensing circuit 3 has a slow enough response time to ensure that brief negative transients at $V_{out}$ do not trigger an erroneous change from PFM to PWM mode, (2) when the regulator changes from PFM to PWM mode, the control logic circuit 5 forces the regulator to remain in PWM mode while the PWM control loop settles out (otherwise, during this period control logic circuit 5 may detect $I_{ind,pk}$ falling below $I_{pk,min}$ for brief transients, thereby causing the regulator to oscillate between PWM and PFM operation), and (3) the PFM current limit ($I_{Lim,PFM}$) is greater than twice the value of the minimum output current required for PWM operation ($I_{out,min}$) (this condition ensures that the maximum output current for PFM mode ($I_{Lim,PFM}/2$) is greater than $I_{out,min}$. If $I_{Lim,PFM}/2$ is less than or equal to $I_{out,min}$, the regulator will oscillate between PFM and PWM modes).

Figure 4A:
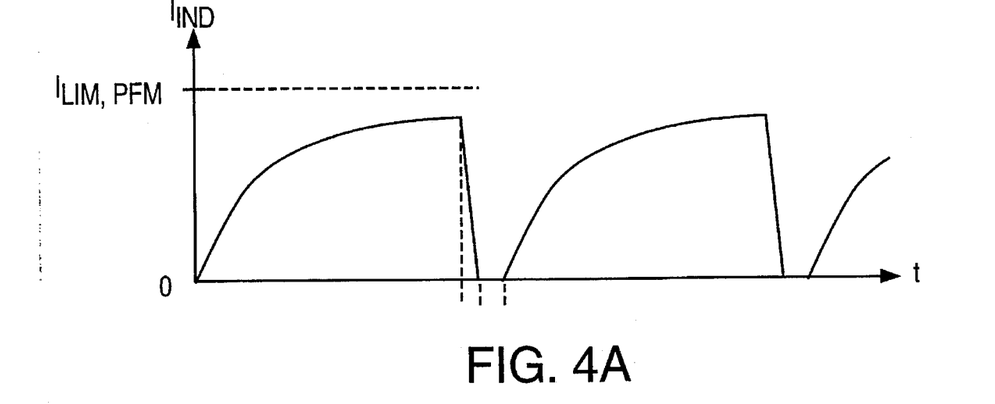
FIGS. 4A–4C are pictorial representations of the inductor current, switching node voltage, and feedback voltage during PFM mode of voltage regulation.
Figure 4B:
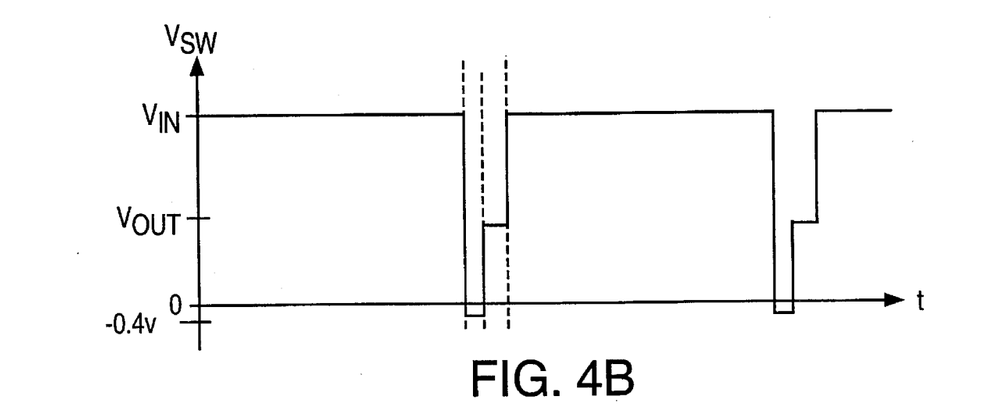
Figure 4C:
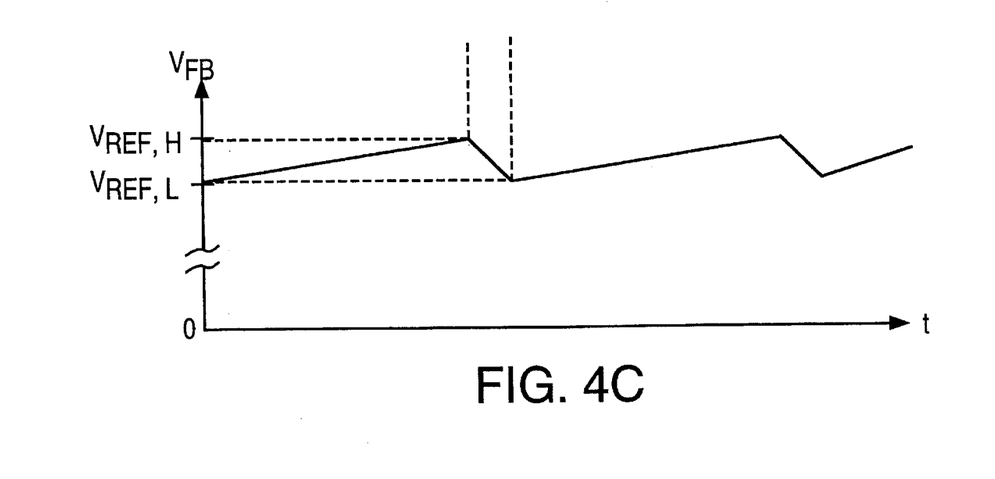
Figure 5A:
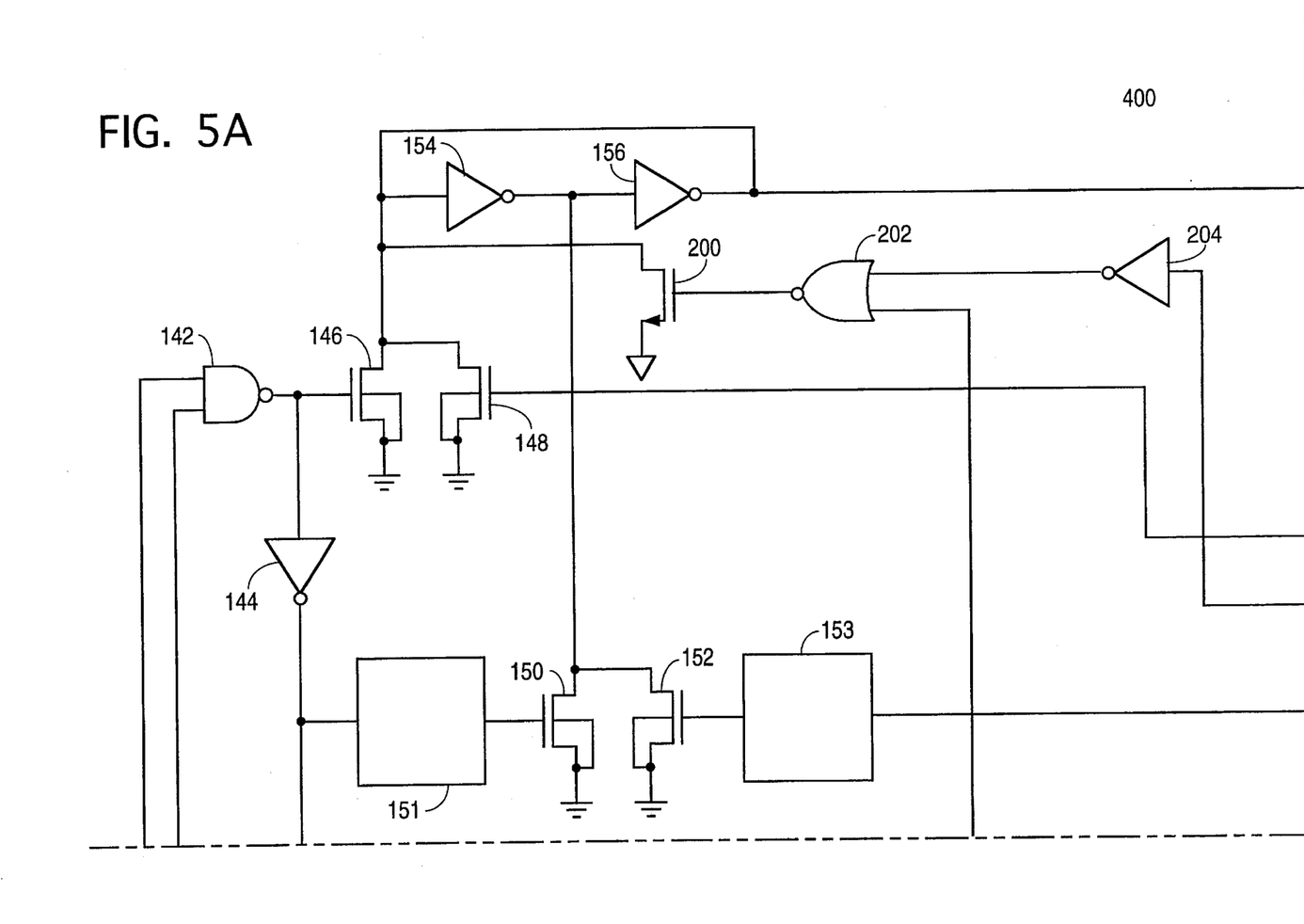
FIG. 5 is a gate level schematic of one embodiment of the present invention.
Figure 5B:
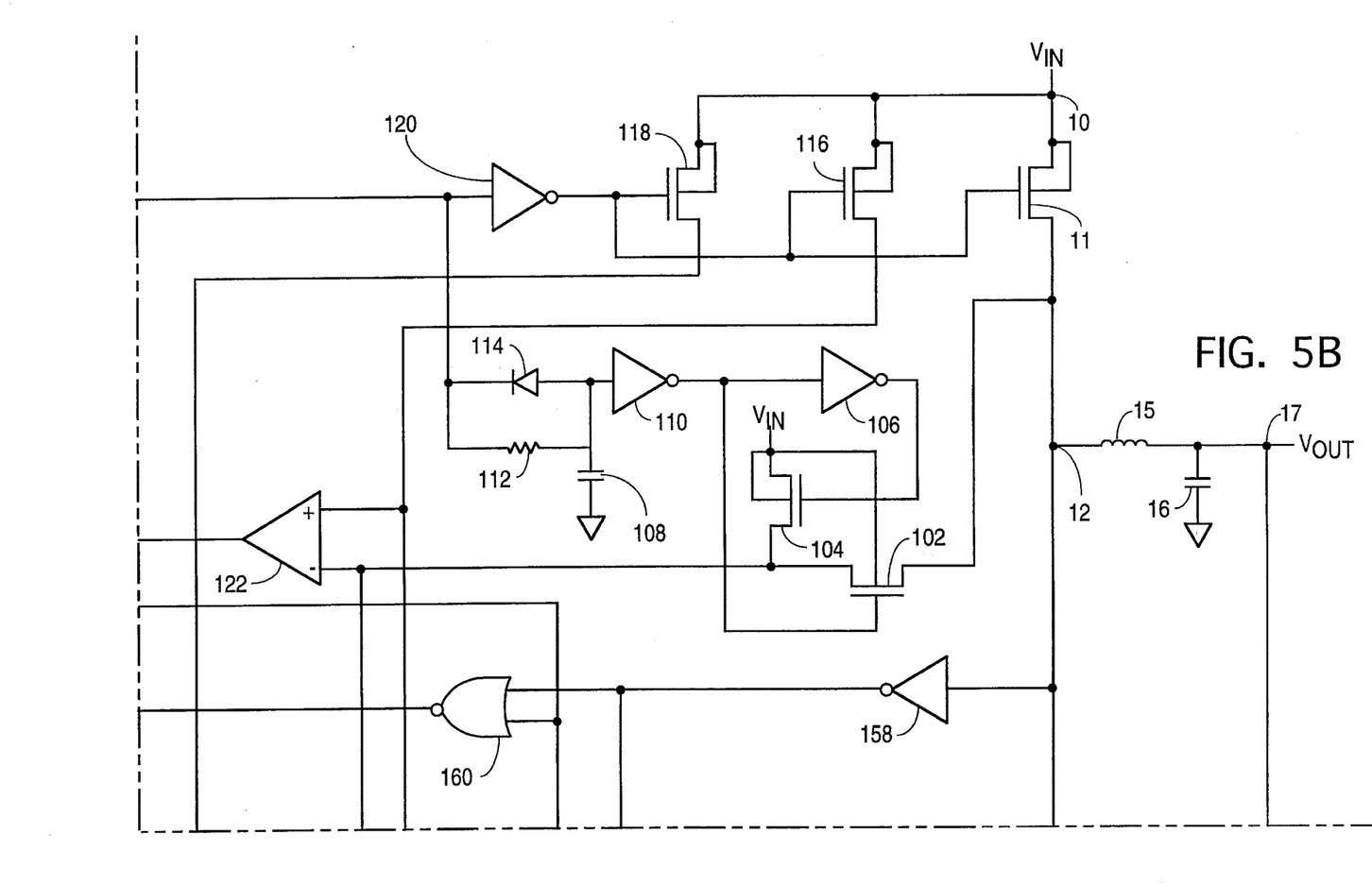
Figure 5C:
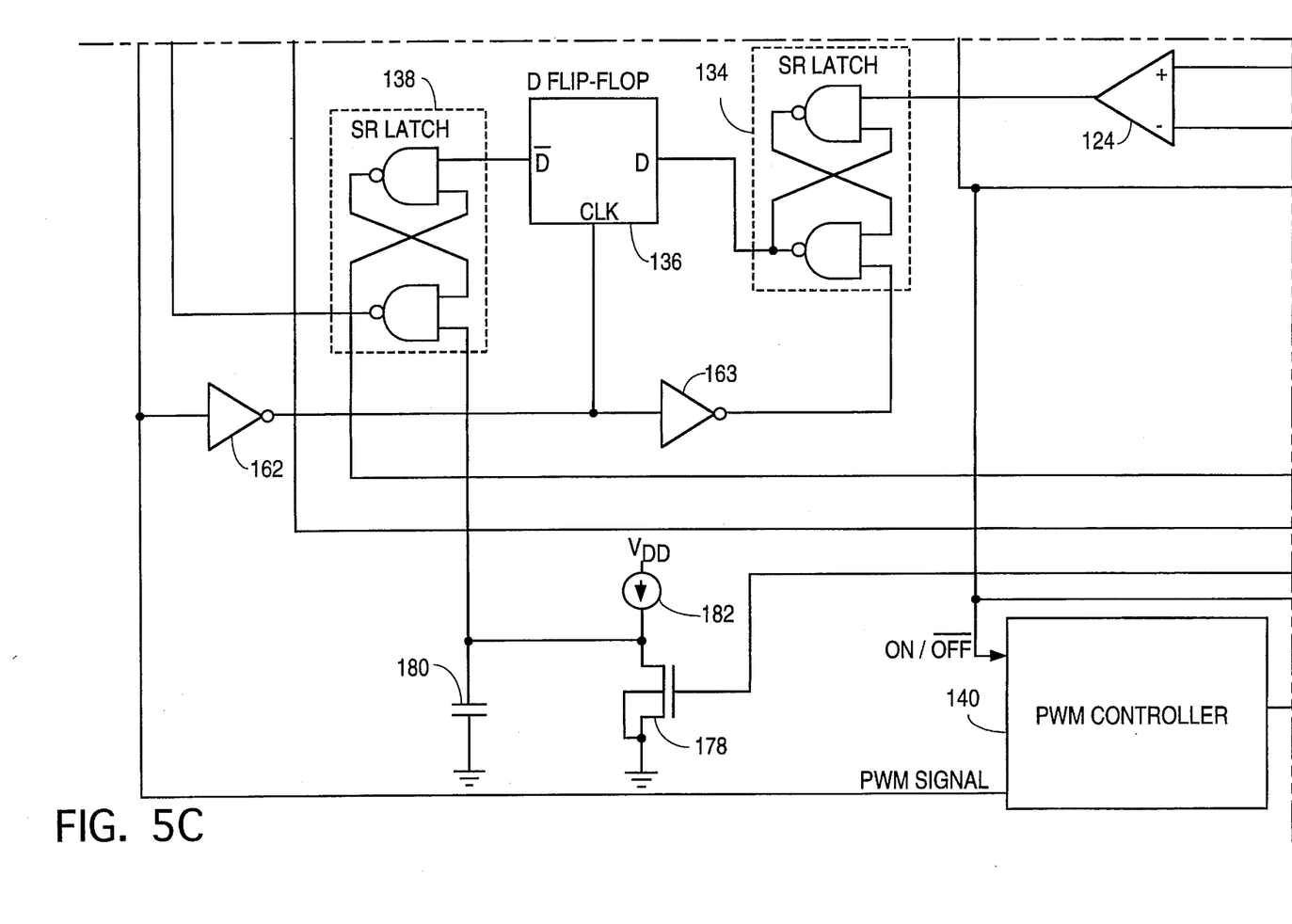
Figure 5D:
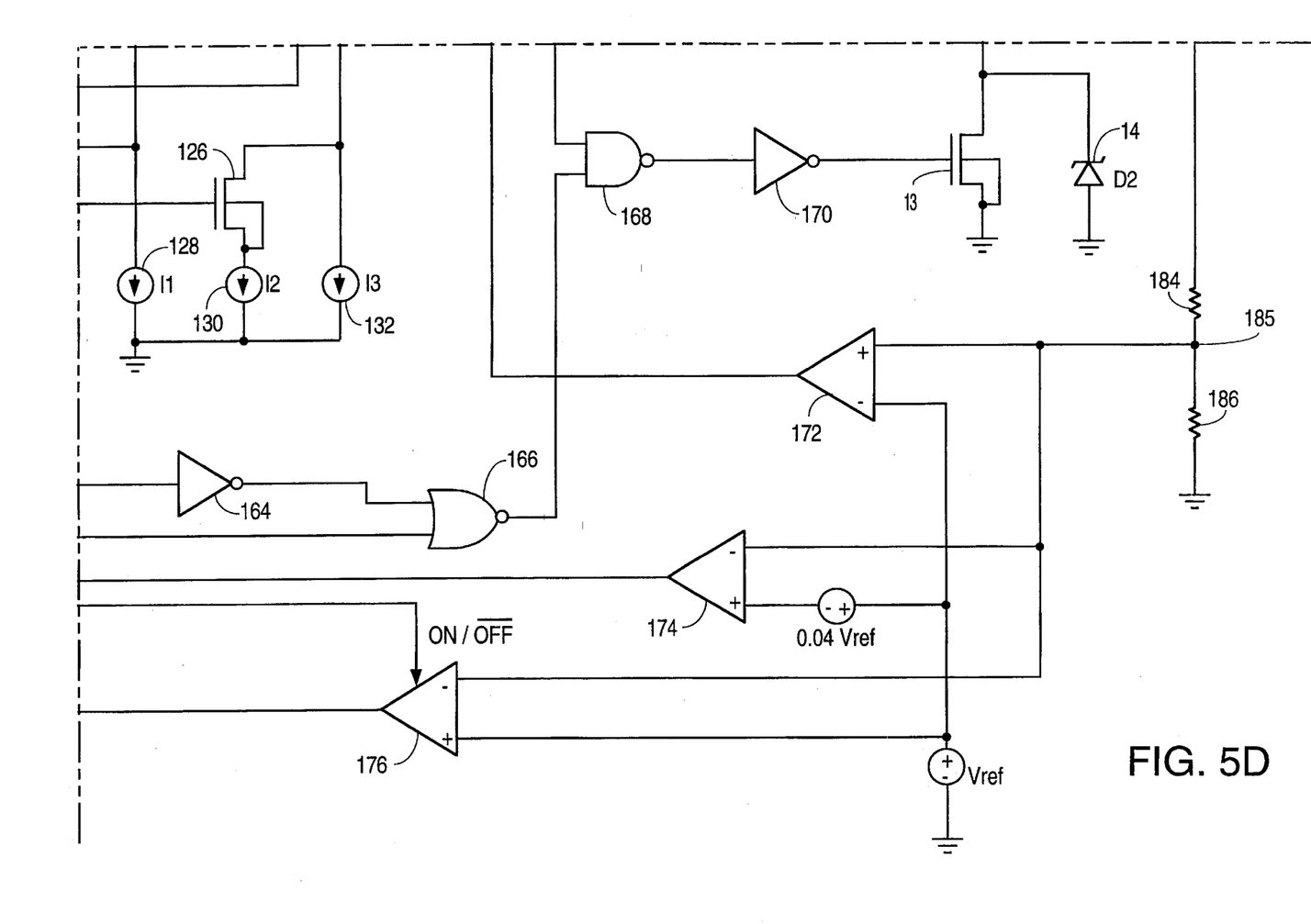

The PFM mode of operation described above varies when the difference between $V_{in}$ and $V_{out}$ is approximately 1 volt or less and the output current is less than $I_{Lim,PFM}$. FIGS. 4A, 4B, and 4C illustrate the current of inductor 15 ($I_{ind}$), the voltage at switching node 12 (Vsw), and the output of feedback circuit 2, respectively, when the regulator is operating in PFM mode in this particular situation. Since under these conditions $I_{ind}$ never exceeds $I_{Lim,PFM}$, inductor current sense circuit 4 does not cause PFM control circuit 7 to turn switch 11 off. Thus, as described previously, switch 11 will remain on until $V_{fb}$ exceeds $V_{ref,H}$, at which point PFM control circuit 7 causes switch 11 to turn off. Inductor 15 then discharges through schottky diode 14, causing $V_{sw}$ to swing from approximately $V_{in}$ to −0.4V. When $I_{ind}$ reaches a zero level, $V_{sw}$ abruptly changes from −0.4V to $V_{out}$. However, switch 11 remains off until $V_{fb}$ falls below $V_{ref,L}$. PFM control circuit 7 then causes switch 11 to turn on. $I_{ind}$ will then increase, but it will never exceed $I_{Lim,PFM}$. Therefore, switch 11 remains on until $V_{fb}$ rises above $V_{ref,H}$.

Thus, the present invention achieves high efficiency over a wide range of output currents by automatically switching between PFM mode operation (when the output current is relatively small) and PWM mode operation (when the output current exceeds a predetermined level).

FIG. 5 is a gate-level schematic of one embodiment of the present invention. When power is first applied to the regulator circuit at $V_{in}$, $V_{out}$ is below its nominal value, $V_{out,nom}$. This is detected by comparator 174 which sends a logic high signal to the gate of switch 178, turning on switch 178. The drain of switch 178 then swings low, forcing the output of SR latch 138 high which, in turn, enables the PWM controller 140. This high signal from latch 138 also disables the PFM control circuit by forcing the output of NOR gate 202 low. Thus, the circuit initially operates in PWM mode and will remain in PWM mode as long as the peak inductor current $I_{ind,pk}$ is equal to or greater than the minimum current required for PWM mode, $I_{pk,min}$. When $I_{ind,pk}$ drops below $I_{pk,min}$, the regulator switches to PFM mode as previously described.

PWM controller 140 generates a fixed frequency square wave PWM signal with a variable duty cycle. When the PWM signal is high (rising edge), a logic low signal appears at the output of invertor 170, turning off low-side switch 13. This high PWM signal also puts a logic high at the input of pulse circuit 151, which turns on switch 150 long enough to pull down the input of invertor 156, thus turning on switch 11. Switch 150 is used to turn on switch 11 during PWM mode, while switch 152 is used to turn on switch 11 during PFM mode.

Positive feedback is applied to inverters 154 and 156 so that the output of invertor 156 will remain low after switch 150 (PWM mode) or switch 152 (PFM mode) turns off. It is important that switches 150 and 152 turn off as soon as possible to ensure that switches 146, 148, and 200 can reset the output of invertor 156 to a logic low to turn off switch 11. Hence, switches 150 and 152 must be turned on with a relatively narrow pulse at the beginning of the PWM and PFM switching cycles, respectively.

Pulse circuits 151 (PWM mode) and 153 (PFM mode) detect a leading edge from the outputs of invertor 144 and nor gate 160, respectively, and generate a positive pulse approximately 200 nanoseconds long at the gates of switches 150 and 152, respectively. This pulse turns on switches 150 and 152 just long enough to set the output of invertor 156 high, thereby turning on high-side switch 11.

When the PWM signal is low (falling edge), switch 146 pulls down the input of invertor 154, turning off switch 11. This low PWM signal also provides a logic high at the input of NAND gate 168, allowing low-side switch 13 to turn on when $V_{sw}$ swings low to −0.4V. This method of turning on switch 13 results in break-before-make switching of switches 11 and 13. Switch 11 remains off and switch 13 remains on until the beginning of the next PWM cycle.

Error amplifier 176 monitors $V_{out}$ during PWM operation by measuring the difference between the $V_{fb}$ and $V_{ref}$ ($V_{out}$ appears across resistors 184, 186 which, acting as a voltage divider, generate $V_{fb}$ at node 185). This voltage difference is amplified and provided as input to PWM controller 140. PWM controller 140 uses this amplified voltage difference to adjust the duty cycle of the PWM signal so that $V_{fb}$ equals $V_{ref}$, thereby regulating $V_{out}$. PWM controller 140 can be either a voltage mode or current mode controller. In order to achieve maximum efficiency when the regulator is operating in PFM mode, PWM controller 140 and error amplifier 176 remain off during PFM mode.

The regulator indirectly senses the current of inductor 15 by monitoring the drain to source voltage $V_{ds}$ of switch 11. When switch 11 is on, switch 102 connects the drain of switch 11 to the inputs of comparators 122 and 124. When switch 11 is off, switch 104 shorts the inputs of comparators 122 and 124 to the input voltage $V_{in}$. In order to eliminate the noise at the leading edge of the $V_{ds}$ waveform when switch 11 is turned on, capacitor 108 and resistor 112 keep switch 102 off and switch 104 on until switch 11 has been on approximately 200 nanoseconds. When switch 11 turns off, diode 114 allows switch 102 to turn off and switch 104 to turn on immediately.

Comparator 122 causes high-side switch 11 to turn off when the peak inductor current $I_{ind,pk}$ has exceeded the current limit for PWM mode ($I_{lim,pwm}$) and PFM mode ($I_{Lim,PFM}$). Comparator 122 monitors $I_{ind,pk}$ by comparing the $V_{ds}$ of switch 11 to $V_{ds}$ of switch 116. In one embodiment, switch 11 is a power MOSFET constructed of thousands of small MOSFET cells connected in parallel. Switch 116 is one of those MOSFET cells with its drain separated from the drain of switch 11. Switch 116 has an area factor of 1 (1 cell), while switch 11 has an area factor of K (K cells).

When the regulator operates in PFM mode, switch 126 is off, allowing only current source 132 to flow through switch 116. Current source 132 is set equal to $I_{Lim,PFM}/K$ so that the $V_{ds}$ of switch 116 equals the $V_{ds}$ of switch 11 when $I_{ind}$ equals $I_{Lim,PFM}$. In other words, when the regulator is operating in PFM mode, the threshold voltage of comparator 122 corresponds to $I_{Lim,PFM}$.

When the regulator is operating in PWM mode, switch 126 turns on to allow both current sources 130 and 132 to flow through switch 116. Current source 130 is set to a value so that the sum of current sources 130 and 132 equals $I_{Lim,pwm}/K$. Thus, the threshold voltage of comparator 122 corresponds to $I_{Lim,pwm}$ when the regulator is operating in PWM mode.

Comparator 124, monitoring the peak inductor current $I_{ind,pk}$ by comparing the $V_{ds}$ of switch 11 with the $V_{ds}$ of switch 118, determines when the regulator should switch from PWM mode to PFM mode. Like switch 116, switch 118 is a single MOSFET cell (having an area factor of 1) with its drain separated from the drain of switch 11. Current source 128 provides a current through switch 118 equal to $I_{pk,min}/K$, so that the $V_{ds}$ of switch 11 equals the $V_{ds}$ of switch 118 when $I_{ind}$ reaches the value $I_{pk,min}$. The value of $I_{pk,min}$ is adjusted by a multiplier circuit so that it changes in proportion to changes in $V_{in}-V_{out}$. This allows $I_{pk,min}$ to change in proportion to changes in $\Delta I_{ind}$ which, as shown in equation 1, results in $I_{out,min}$ remaining constant.

Figure 6A:
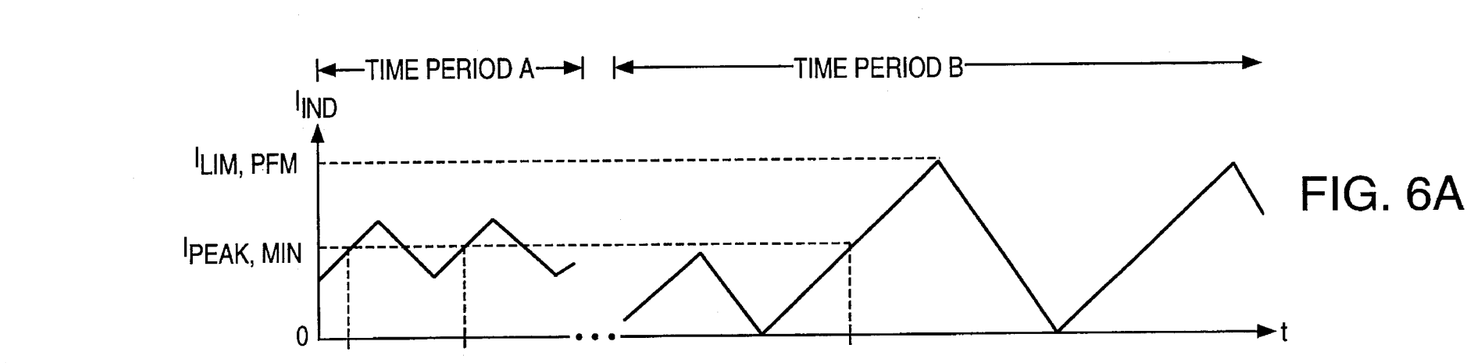
FIG. 6A shows the inductor current during both PFM mode and PWM mode.
Figure 6B:
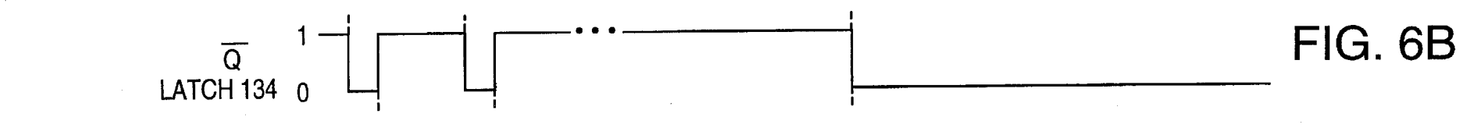
FIGS. 6B–6E are timing diagrams showing the logic states of various components in the preferred embodiment.
Figure 6C:
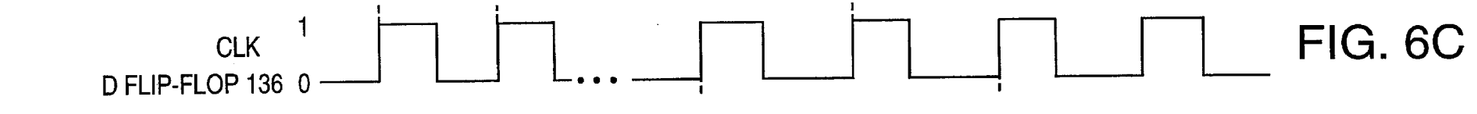
Figure 6D:
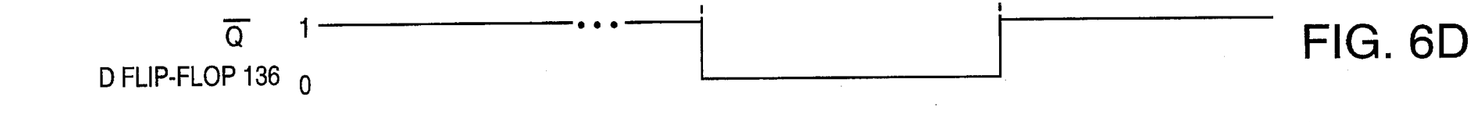
Figure 6E:
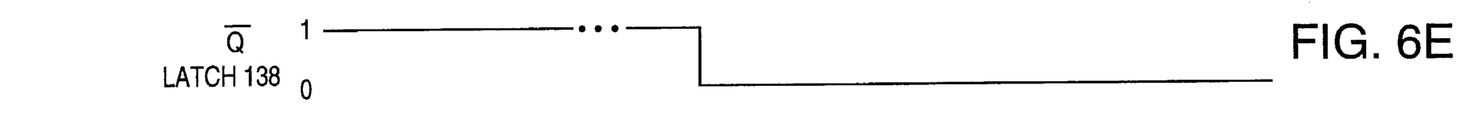

Accordingly, if the peak inductor current $I_{ind,pk}$ is greater than $I_{pk,min}$, the regulator remains in PWM mode. Referring to FIG. 6A, this event corresponds to time period A. Comparator 124 outputs a logic low which in turn produces a logic low at the output of SR latch 134. The output of latch 134 remains low until reset to logic high by the falling edge of the PWM signal (see FIG. 6B). When switch 11 turns off, the rising edge of the inverted PWM signal appears at the clock input of master-slave D flip-flop 136 (see FIG. 6C). The inverted PWM signal is inverted again and used as the reset signal for latch 134. Due to the time delay of invertor 163 and latch 134, the rising edge of the clock input of flip-flop 136 occurs before the output of latch 134 is reset to a logic high. Under the conditions of time period A, the output of flip-flop 136 is set to a logic high and remains high so long as $I_{ind,pk}$ exceeds $I_{pk,min}$ (see FIG. 6D). The logic high output from flip-flop 136 has no effect on the previously set high output of SR latch 138 (see FIG. 6E).

The logic high signal at the output of latch 138 turns on PWM controller 140 and error amplifier 176, as well as allowing the PWM signal to propagate through NAND gate 142, thereby enabling PWM operation. The high signal from the output of latch 138 also turns on switch 126, re-setting the threshold voltage of comparator 122 to a value corresponding to $I_{lim,pwm}$. Furthermore, the high signal from the output of latch 138 prevents PFM control signals from propagating through NOR gate 202. By setting the threshold of comparator 122 to $I_{lim,pwm}$ and preventing PFM control signals from propagating through NOR gate 202, PFM mode operation is thereby disabled.

If the inductor current $I_{ind}$ is equal to or exceeds $I_{lim,pwm}$, the output of comparator 122 transitions to a logic high, turning on switch 148. Switch 148 pulls down the input of invertor 120, which turns off switch 11. The positive feedback of weak inverters 154 and 156 keeps the output of 156 low after switch 148 turns off so that switch 11 will remain off until the next rising edge of the PWM signal.

When $I_{ind,pk}$ is less than $I_{pk,min}$ (corresponding to time period B in FIG. 6A), the regulator enters PFM mode. The output of comparator 124 and the output of latch 134 remain at logic high when the PWM cycle ends (see FIG. 6B), causing the output of flip-flop 136 to transition to logic low (see FIG. 6D). The logic low signal at the output of flip-flop 136 sets the output of latch 138 low (see FIG. 6E), which will remain low until reset to logic high by switch 178. This low signal from latch 138 turns off PWM controller 140 and error amplifier 176, and it prevents the PWM signal from propagating through NAND gate 142, thereby disabling the PWM control circuit. The low signal from latch 138 also enables PFM control signals to propagate through NOR gate 202. In addition, the low signal from the output of latch 138 turns off switch 126, resetting the threshold voltage of comparator 122 to a value corresponding to $I_{Lim,PFM}$. In other words, a low signal from the output of latch 138 switches the regulator from PWM mode to PFM mode.

Once in PFM mode, the on and off states of high-side switch 11 are controlled as described previously. Assuming that switch 11 is initially on, current flows through inductor 15 to output terminal 17. When the inductor current $I_{ind}$ exceeds $I_{Lim,PFM}$, comparator 122 turns off switch 11. $I_{ind}$ then discharges through diode 14, causing $V_{sw}$ to drop to −0.4 volts. When $I_{ind}$ discharges to zero, causing $V_{sw}$ to swing to $V_{in}$, invertor 158 sends a logic low signal to NOR gate 160 which, in turn, puts a logic high at the input of pulse circuit 153. Pulse circuit 153, generating a brief turn on pulse at the gate of switch 152, causes switch 11 to turn on and thereby starts a new switching cycle.

The regulator will skip cycles when $V_{out}$ exceeds its nominal value $V_{out,nom}$. Comparator 172 monitors $V_{out}$ by comparing $V_{fb}$ to $V_{ref}$. When $V_{fb}$ is greater than $V_{ref}$, comparator 172 puts a logic high at an input of NOR gate 160, thereby preventing switch 11 from turning on in response to the signal swing of $V_{sw}$ via invertor 158. The logic high signal from comparator 172 also propagates through invertor 204 and NOR gate 202 so as to turn on switch 200, which causes switch 11 to turn off. Thus, high-side switch 11, turning off when the output voltage has exceeded its nominal value, will turn back on (when $I_{ind}$ discharges to zero) only if the output voltage has dropped to less than or equal to its nominal value. As explained earlier, $V_{fb}$ exhibits hysteresis to prevent the regulator from sporadically skipping cycles. Preferably, comparator 172 exhibits hysteresis at its input terminals of approximately 10 mV.

As mentioned previously, a variation of PFM mode operation occurs when (1) the difference between $V_{in}$ and $V_{out}$ is approximately 1 volt or less and (2) the output current is less than $I_{Lim,PFM}$. Since under these conditions the inductor current never exceeds $I_{Lim,PFM}$, the output of comparator 122 will remain at logic low and thus never turn off switch 11. When $V_{out}$ exceeds $V_{out,nom}$, the logic high output of comparator 172 turns on switch 200 which, in turn, causes switch 11 to turn off. The regulator then stops delivering current to output node 17. The output of comparator 172 will remain at logic high until $V_{out}$ falls below $V_{out,nom}$. When the output of comparator 172 has transitioned to logic low, and $I_{ind}$ has discharged to zero, invertor 158 sends a logic low signal to NOR gate 160 which, in turn, causes pulse circuit 153 to generate a brief output pulse that turns on high-side switch 11. The regulator again supplies current to output terminal 17. As a result, the regulator maintains a constant output voltage by supplying current from $V_{in}$ to output terminal 17 when $V_{out}$ is less than or equal to $V_{out,nom}$. Accordingly, when $V_{out}$ is exceeds $V_{out,nom}$, the regulator does not supply current from $V_{in}$ to output terminal 17, thereby allowing this current to discharge through capacitor 16 until $V_{out}$ again falls below $V_{out,nom}$.

The regulator switches from PFM mode back to PWM mode when the output current exceeds $I_{Lim,PFM}/2$, which causes $V_{out}$ to fall below $V_{out,nom}$. This drop in $V_{out}$ is detected by comparator 174, whose threshold voltage is set to a value about four percent below $V_{ref}$. Thus, when $V_{out}$ falls approximately four percent below $V_{out,nom}$, the output of comparator 174 transitions to a logic high, turning on switch 182 and thereby resetting latch 138. The logic high at the output of latch 138 re-enables the PWM control circuit and disables the PFM control circuit, as described earlier.

The PWM signal, when re-enabled, may take one hundred or more cycles to settle out. During this period, the inductor current will fluctuate causing $I_{ind,pk}$ to dip below $I_{pk,min}$ for brief transients. To prevent the regulator from oscillating between PWM and PFM modes during these brief transients, the regulator keeps the reset input of latch 138 low for a predetermined amount of time after PWM controller 140 has been re-enabled, as follows. After the regulator re-enters PWM mode, and the output of comparator 174 transitions to a logic low, current source 182 requires several hundred microseconds to pull-up the reset input of latch 138 to a logic high. Accordingly, this time delay forces the regulator to remain in PWM mode for several hundred microseconds after PWM mode is re-enabled.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a switching regulator comprising the steps of:

generating a regulated output voltage and an output current at an output terminal of said regulator using a switching device, said switching device having an on state and an off state, said switching device providing said output current;

comparing one or more signals corresponding to said output current to one or more threshold current levels, said one or more threshold current levels corresponding to predetermined output current levels;

generating one or more first control signals in response to said step of comparing;

controlling said switching device with a first control circuit in response to said one or more first control signals indicating said output current is greater than a first current level, wherein said first control circuit comprises:

a square wave generator outputting a square wave having a first frequency and having a duty cycle corresponding to said regulated output voltage at said output terminal, said square wave generator controlling the on and off states of said switching device; and a first feedback circuit for generating an error signal based on a difference between a voltage corresponding to said output voltage at said output terminal and a first reference voltage level and varying the duty cycle of said square wave generator in response to said error signal to cause said output voltage to be of a predetermined voltage level; and controlling said switching device with second control circuit in response to said one or more first control signals indicating said output current is less than said first current level by a predetermined amount, wherein said second control circuit comprises:

a signal generator outputting a switching signal having a fixed duty cycle and having a second frequency, said signal generator controlling the on and off states of said switching device, wherein said second frequency is less than said first frequency; and a second feedback circuit for generating a disable signal when said output voltage at said output terminal exceeds a second reference voltage level, said disable signal forcing said signal generator to skip one or more cycles to cause said output voltage to be of said predetermined voltage level.

2. The method of claim 1 wherein said predetermined amount is zero.

3. The method of claim 1 wherein said predetermined amount is greater than zero.

4. The method of claim 1 further comprising the steps of:

comparing said output voltage at said output terminal with a third reference voltage level;

generating a second control signal in response to said step of comparing said output voltage; and controlling said switching device with said first control circuit in response to said second control signal indicating said output voltage at said output terminal is less than said third reference voltage level.

5. The method of claim 1 wherein said switching device comprises a first MOSFET device, said one or more signals corresponding to said output current in said step of comparing being determined by comparing a voltage at a terminal of said first MOSFET device to one or more threshold voltage levels, said threshold voltage levels corresponding to said predetermined output current levels.

6. The method of claim 5 wherein said threshold voltage levels include a voltage at a terminal of a second MOSFET device having characteristics substantially identical to said first MOSFET device, said second MOSFET device conducting a fixed reference current.

\* \* \* \* \*